US008766626B2

(12) United States Patent
Pellegrini

(10) Patent No.: US 8,766,626 B2
(45) Date of Patent: Jul. 1, 2014

(54) ROTATION PATH DETECTION DEVICE

(75) Inventor: Andreas Pellegrini, Wabern (DE)

(73) Assignee: Gebr. Bode GmbH & Co. KG (DE)

( * ) Notice: Subject to any disclaimer, the term of this patent is extended or adjusted under 35 U.S.C. 154(b) by 1002 days.

(21) Appl. No.: 12/864,292

(22) PCT Filed: Nov. 17, 2008

(86) PCT No.: PCT/EP2008/065650
§ 371 (c)(1),
(2), (4) Date: Jul. 23, 2010

(87) PCT Pub. No.: WO2009/092471
PCT Pub. Date: Jul. 30, 2009

(65) Prior Publication Data

US 2010/0295542 A1 Nov. 25, 2010

(30) Foreign Application Priority Data

Jan. 24, 2008 (DE) ..................... 20 2008 001 066 U

(51) Int. Cl.
*G01B 7/30* (2006.01)

(52) U.S. Cl.
USPC ................... 324/207.25; 296/146.4; 296/155; 49/333; 49/334

(58) Field of Classification Search
None
See application file for complete search history.

(56) References Cited

U.S. PATENT DOCUMENTS

| | | | | |
|---|---|---|---|---|
| 4,691,949 | A * | 9/1987 | Grantz et al. | 292/216 |
| 4,939,946 | A * | 7/1990 | Teramachi | 74/89.3 |
| 5,533,942 | A * | 7/1996 | Fukaya | 475/178 |
| 6,336,674 | B1 * | 1/2002 | Gerisch et al. | 296/146.16 |
| 2007/0194600 | A1 * | 8/2007 | Oxley | 296/146.4 |

FOREIGN PATENT DOCUMENTS

| | | | |
|---|---|---|---|
| DE | 3743159 | A1 | 6/1989 |
| DE | 10019957 | A1 | 10/2001 |
| DE | 102006030724 | A1 | 1/2008 |
| EP | 0725201 | A1 | 8/1996 |
| EP | 1475509 | A1 | 11/2002 |
| EP | 1738993 | A2 | 1/2006 |
| WO | 03062576 | A1 | 7/2003 |

OTHER PUBLICATIONS

International Search Report PCT/EP2008/065650; Dated Mar. 4, 2009.

* cited by examiner

*Primary Examiner* — Arleen M Vazquez
*Assistant Examiner* — Feba Pothen
(74) *Attorney, Agent, or Firm* — Cantor Colburn LLP

(57) ABSTRACT

The invention relates to a rotation path detection device for vehicles of public transportation having a drive device (20) for an entry/exit apparatus, which is mounted so it can be pivoted and/or displaced. Said apparatus has a drive unit (22), an electric drive motor (44), and a first reduction gear (26) and a second reduction gear (72), which is connected to the drive motor (44), having a sensor for ascertaining the position of the reduction gear.

10 Claims, 7 Drawing Sheets

ROTATION PATH DETECTION DEVICE

TECHNICAL FIELD

The invention generally relates to a rotary travel detection device for public transport vehicles with a drive device for a pivotably and/or slidably mounted entry/exit facility, with a drive unit, an electrical drive motor and a first reduction gear unit. Such entry/exit facilities include, for example, doors, ramps, treads or the like.

BACKGROUND

A drive system of this type generally comprises at least one actuator or a drive motor and a mechanical system driven by it, and/or a gear unit for effecting the pivoting or sliding movement of the door, ramp, tread or the like. Acquiring the pivoting movement of the mechanical system or of the gear unit by means of, for example, a potentiometer pick-off is known. Such a potentiometer assembly has proven in practice not to be sufficiently wear-resistant and robust in order to satisfy the high safety requirements in passenger transportation. Moreover, it is known to control or at least monitor the pivoting or sliding movement by means of switching contacts triggering at the final positions. Though a high degree of reliability can be achieved depending on the switching contact structure, and also by means of redundant components, but what is a drawback in this case is that these final positions are fixed once the installation and adjustment has taken place. A later adjustment, for example during the final assembly of the entry/exit facility into a passenger transport vehicle has proved to be very time-consuming due to the comparatively poor accessibility of the switching contacts. This poor accessibility on the one hand is due to the desired compactness of such drives, and on the other hand, to these switching contacts generally being disposed directly on the moving door, ramp, tread etc., for example on their associated pivoting pins, and not on the driving mechanical system, in order thus to be certain that these moving elements, such as the door, ramp, tread etc. are actually in the condition indicated by the state of the switching contact, for example open or closed. Furthermore, it was found that during operation, a later adjustment is often required during the operating live of the vehicle because of wear and the accompanying increasing clearance between the mechanically interacting components.

BRIEF SUMMARY OF THE INVENTION

The invention provides a generic rotary travel detection device for an entry/exit facility with at least one pivotably and/or slidably mounted door, ramp, tread or the like of a passenger transport vehicle, which is inexpensive to manufacture and in which the position detection can be adjusted in a simplified manner. In particular, the rotary travel detection device is supposed to be suitable also for drive devices that have a compact configuration. The drawbacks of the prior art are to be avoided.

The invention further provides a generic rotary travel detection device which is characterized by a second reduction gear unit connected with a drive motor, with an encoder for determining the position of the reduction gear unit.

In order to be able to determine the exact position of the entry/exit facility, preferably a door, it is expedient to detect the rotary travel directly via an appropriate encoder. Such an encoder, for example, an absolute value encoder, determines the position of the door even in the non-energized state of the motor, and, when the power supply is switched on again, recognizes the position even if the door leaf has been moved manually in the interim. Absolute value encoders, with which corresponding values are picked off directly on the output shaft of the drive motor via sliding contacts above the rotation post, have proved themselves viable. According to the invention, however, a contactless electronic absolute value encoder can also be used. In the case of the embodiment according to the invention, the rotation of the output shaft of the drive motor is indirectly determined through the rotation of an output shaft of the second reduction gear unit which is also coupled to the drive motor.

In a particularly advantageous embodiment, the second reduction gear unit has the same reduction ratio as the first reduction or output gear unit. According to the invention, however, the second reduction gear unit can also have a higher reduction ratio, for example to ensure a higher resolution in the detection. Conversely, the reduction ratio can also be selected such that the second reduction gear unit has a lower reduction ratio in order to cause as little movement and thus, wear, as possible. However, the reduction ratio between the reduction gear units has to be known in all cases in order to be able to determine exactly the rotation of the output shaft of the first reduction gear unit from the rotation of the output shaft of the second reduction gear unit.

Depending on the reduction ratio, the rotary travel detection cannot take place mechanically, for example via slip rings, but must be determined electronically, for example. This is the case because slip rings, for example, are able to detect a maximum of 360°.

The encoder, for example a magnet, as well as a housing, for example for accommodating an electronic chip, can be fitted axially-centrally on the second reduction gear unit without any problems. The encoder determines the position of the reduction gear unit and thus, given a known reduction ratio, indirectly the position or the rotary travel of the entry/exit facility.

The detection of the rotary travel via the output shaft of the drive motor has the advantage that possible material fractures in the drive can be recognized and reported in the case the door opens inadvertently.

According to the invention, the second reduction gear unit is also designed as a planetary gear unit. Planetary gear units usually have a certain clearance which can advantageously be compensated by means of increased amounts of grease. This measure is extremely cost-effective and is completely sufficient because the second reduction gear unit does not have to transmit any torque. Preferably, a relatively rigid or high-viscosity grease can be used.

The rotary travel detection device according to the invention is particularly suitable for a drive device of compact configuration, in which the drive unit can be disposed in a rotation post which moves the entry/exit facility, i.e. generally a door. Due to this arrangement, the construction space above the door is not required anymore and can be used for other devices. What is also important in such an arrangement, however, is the fact that a counter-bearing is put up against the torque raised by the drive device. Therefore, the drive unit is attached to a fixed component of the vehicle. It is thus possible that the output torque of the drive device can be transmitted onto the rotation post and that the latter rotates.

Accommodating the drive unit directly in the rotation post, apart from saving space, also has many advantages with regard to maintenance and installation of the entire drive device.

According to the invention, the drive device has a support which takes into consideration that twisting and deflection of the rotation post, which is due to its length, can hardly be avoided during operation. The movements of the rotation post are caused, for example, by the vehicle being compressed or twisted due to acceleration and braking processes as well as cornering. In the case of buses, the contact of tires with curbstones and similar edges leads to a deformation of the vehicle and thus, to a movement of the rotation post. Since the drive unit is fixed on a stationary component, such twists and deflections of the rotation post can have a negative effect on the drive device. According to the invention, the drive unit for this reason is connected with the retaining component via a bearing, which enables the rotation post to tumble but prevents a rotation about the axis of rotation Z-Z. Tumbling is understood to mean a deflection from the axis of rotation Z-Z in the X-direction and/or Y-direction. This function cancels, so to speak, a relative movement between the drive unit and the post.

Advantageously, a movement in the Z-direction, that is, in the direction of the axis of rotation Z-Z, is still possible. For this purpose, a guide shaft connecting the drive unit with the bearing is slidably mounted in a guide of the bearing. For transmitting the torque, the guide shaft is preferably non-circular; it can have, for example, a multi-edged or polygonal geometry.

The rotation post itself is rotatably mounted, preferably also in the same retaining component which also supports the drive unit. By using a conventional joint bearing for mounting the rotation post, the latter is able to rotate in the retaining component and at the same time can compensate deviations of position between the upper and the lower bearing in the X-direction and Y-direction. The pivot point of the guide shaft and the rotation post bearing should in this case lie in one plane, that is, be disposed in approximately the same position of the axis of rotation Z-Z. This prevents strains and loads on the bearings and causes the movement of the drive unit and the rotation post to run as parallel as possible.

The movable and flexible support of the drive device or the drive unit makes fitting the drive device into different vehicles possible. It is even conceivable to use the drive device in a rotation post with a little inclination, for example a slant of up to 5°. In addition, the moveable support helps compensating fitting tolerances, which facilitates the installation and maintenance of the entire drive device.

A ball shaft joint bearing has proved to be a particularly suitable bearing. The guide shaft is guided in a ball receptacle by means of balls. Ball-shaped depressions that keep the balls in position are disposed in the guide shaft. Corresponding elongated depressions, in which the balls are guided, are provided in the ball receptacle in the Z-direction. The position of the elongated guides in the Z-direction prevents the rotary movement about Z but at the same time enables a tumbling movement about Z-Z or a combined rotation about X and Y. Preferably, the ball receptacle can be configured from two parts.

The guide shaft can preferably have a continuous bore, through which the necessary cables and similar connections can be routed, extending along its longitudinal axis. Such a bore is advantageous in that, on the one hand, space utilization is optimized, and on the other hand, the cables and connections routed therein are protected.

The drive unit can be configured and arranged in different ways. For example, the gear unit can be connected to the bearing via its output shaft as the guide shaft; however, an arrangement in which the output shaft of the drive motor, as a guide shaft, is solidly connected with the bearing is also conceivable. In the latter case, the housing of the gear unit, e.g. of the planetary gear unit, is solidly connected to the rotation post. Basically, the drive unit, in contrast to the first embodiment, is merely rotated, so that the gear unit points in the direction of the underlying ground. If the drive motor is energized, the housing of the drive unit rotates, so that the rotation post is made to rotate. In this embodiment, an external tube for the drive unit and the torque support in the region of the bearing can be omitted.

According to the invention, a non-self-locking drive unit or a non-self-locking first reduction gear unit can be provided; the blocking action is thus not provided by the drive unit or the gear unit, but by a blocking device. Because of the weak self-locking action, the manual actuation of the entry/exit facilities is always ensured in the case of an emergency; only the blocking action of the blocking device must be canceled. This results in a high degree of safety.

Since no self-locking action of the drive or the gear unit is provided, an additional blocking action of the drive is an absolute requirement. This can be effected by means of an additional braking device, which, when it is not energized, causes a mechanical lock of the drive. This brake can be released electrically and manually by hand in order to uncouple the drive and thus enable electrical and/or manual operation. The manual release of the brake can take place via a known spring-loaded brake with manual release, wherein the manual release of the brake can be used for a mechanical emergency release device. Such brakes are known by the term “low active brake”. However, any other suitable blocking device can be used alternatively. For example, the brake may act on the output shaft of the drive motor by spring force, and may be electromagnetically releasable.

Alternatively, using a so-called high-active brake is also possible according to the invention. Such a brake is also known under the name armature force brake. This means that the brake is active in the energized state, and the door is fixed in this position. The precondition in this case is that the entrance door is provided with an external locking device for permanently locking the entrance securely in a vehicle that is parked for a longer period of time. This can take place, for example, by means of a remote-controlled central locking system.

In a vehicle that is parked for a shorter period of time, the door can be locked by means of the supply voltage being switched off in a delayed manner, without the external lock. In this case, the brake continues to be energized for this period of time. When the door is not locked and the supply voltage is switched off, the door is not fixed anymore and can be moved manually by hand, in exchange, however, a mechanical emergency release, for example via a Bowden cable, is not required anymore. Emergency release is effected by means, for example, of an opening contact in the control line for the brake. The emergency release can be reset with simple means in a centralized or decentralized manner; for example, a decentralized reset of the emergency release can be carried out via an external relay circuit.

According to the invention, a brake may even be dispensed with entirely as a blocking device if the drive motor can be short-circuited. Thus, the door can be kept locked and prevented from moving by means of the short circuit torque of the drive motor. This function is always guaranteed, even if the vehicle is stationary and is not in operation. If the emergency release is actuated, the connection between the two contacts of the motor is interrupted, preferably via a mechanical switch, the short circuit torque is canceled and the door can easily be opened by hand without any problem. The self-locking action of the door is thus canceled by a simple interruption of the positive and the negative line of the motor. The locking action is always present in the non-energized state of the motor, that is, a power failure does not have any altering influence on it. In the case of power failure or electronic system failure, the emergency release can always be carried out by actuating the short circuit switch. It is possible to lock the entry/exit facility again, in particular a door, after the interruption of the short circuit by switching the switch back.

According to the invention, the short circuit switch preferably works directly without any auxiliary power and thus, also in the case of a disused vehicle or of a power interruption.

The advantages of using such a short circuit switch on the one hand lie in the reduction of the required components for the emergency release, on the other hand, the short circuit switch can be positioned at any ergonomically favorable place; laying the otherwise commonly used Bowden cables or pneumatic lines can be dispensed with.

According to the invention, a combination of a lock on the basis of a short circuit and the use of a brake or mechanical lock is also possible. This can be the case especially if the short circuit torque is insufficient for locking the door securely.

The switchable short circuit can advantageously be ensured by special windings of the motor windings, which are exclusively provided for the purpose of generating the short circuit. An increased braking action or locking action can also be achieved by special windings.

Moreover, the output element of the reduction gear unit can be connected with a lift-and-turn unit, a component known per se, which is used in particular in outward-swinging doors. By lifting the door, the door leaf is connected in a positive fit with the door portal by means of lock strikers.

Furthermore, the brake can be disposed between the motor and the gear unit. Since no torques have to be transmitted via the additional gear unit, the latter can be configured as an inexpensive plastic gear unit.

Of course, a self-locking drive unit can also be used instead of a non-self-locking design. The entire reduction gear unit, for example, can be subdivided into two individual gear units coupled with each other by a disengaging coupling. The controllable coupling can be configured as a coupling engaging under spring force to which a manually operated emergency release device is connected.

In a particularly advantageous embodiment, the first reduction gear unit, together with the drive motor and the first coupling half, is axially connected, by means of the spring force of a compression spring, with the second coupling half and the second reduction gear unit. In this embodiment, the configuration on the coupling is particularly simple and can be realized with significantly fewer components. The external diameter also remains smaller because the connection point of the Bowden cable is provided centrally within the housing.

BRIEF DESCRIPTION OF THE DRAWINGS

The invention will be explained in more detail below with reference to the attached drawings: In the figures.

DETAILED DESCRIPTION

Figure 1:
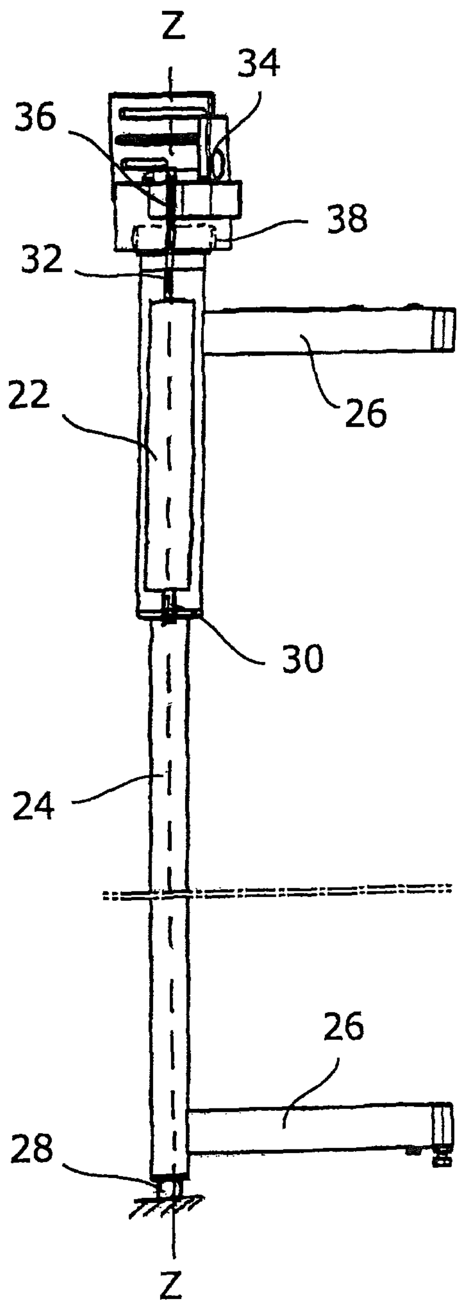
FIG. 1 shows a schematic view of a drive device.

First, FIG. 1 shows a drive device 20 in a simplified schematic view. A drive unit 22 is accommodated in a rotation post 24. The rotation post 24 has supporting arms 26 for attaching a door, which is not shown, and is rotatably mounted via a floor bearing 28 on an underlying ground, usually a vehicle floor.

In addition, a pivot bearing 38 is shown via which the rotation post 24 is mounted rotatably about a longitudinal axis Z-Z in a bearing 34.

An output shaft 54 of the drive unit 22 is non-rotatably connected with the rotation post 24 via a rotation post bearing 30 so that a rotary movement of the rotation post 24 can be effected via the rotation post bearing 30. A guide shaft 32 extends from within the drive unit 22 into the bearing 34 and is non-rotatably connected with the latter via a drive unit bearing 36. The drive unit bearing 36 can, for example, be configured as a ball shaft joint bearing and serves for receiving the torque of the drive unit 22, which in turn is solidly connected to a retaining component 40.

Figure 2:
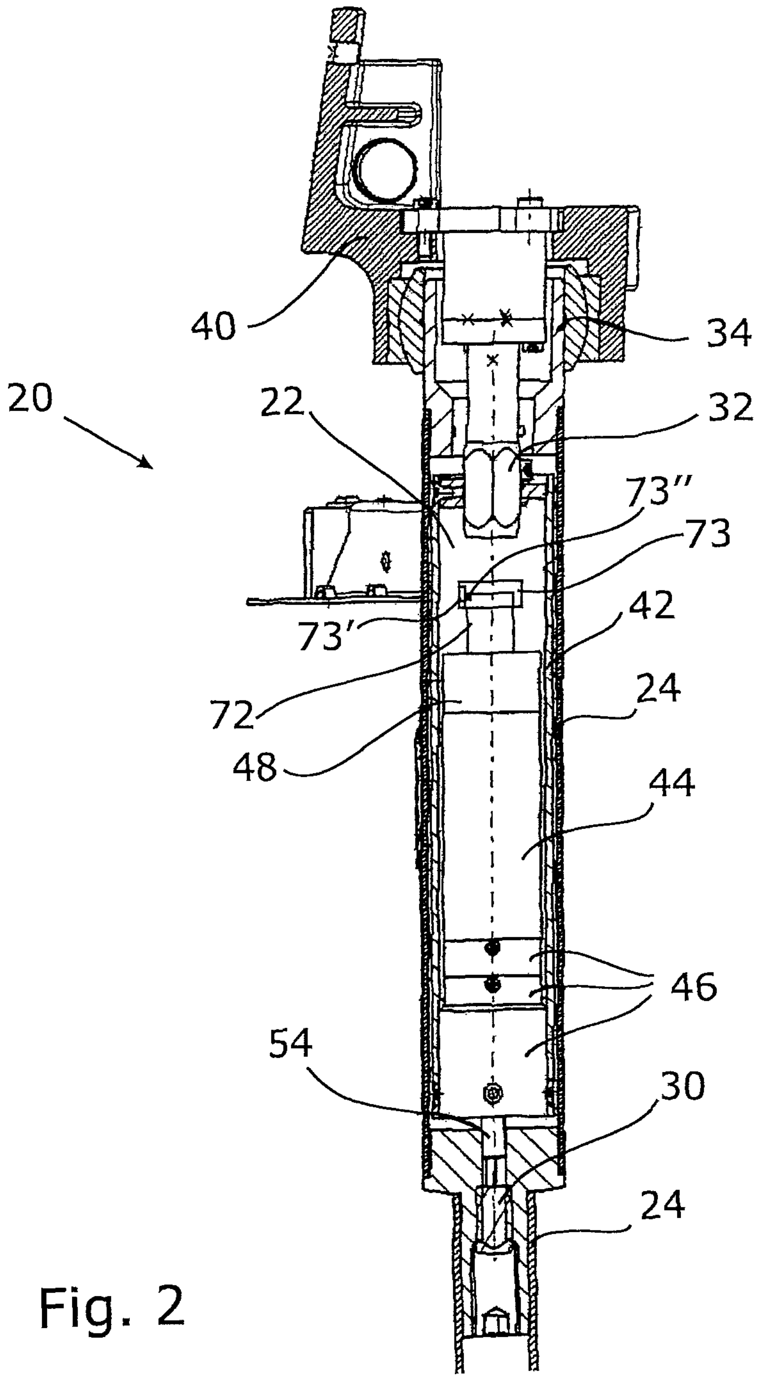
FIG. 2 shows a schematic axial section of an exemplary embodiment of a drive unit for entry/exit facilities.

FIG. 2 shows a drive unit 22 configured as a compact drive and disposed in the rotation post 24, for example for a passenger door, in which an electrical drive motor 44 and a first reduction gear unit 46, which is shown as a three-part planetary gear unit, are disposed in the axial direction one behind the other within a slim housing 42 formed in a tubular manner. The drive motor 44 is adjoined by a brake 48, which is also accommodated within the housing 42 and which can be configured as a "low active brake" that engages under spring force and can be released electromagnetically and mechanically, or as a "high active brake". The first reduction gear unit 46 is configured to be non-self-locking. The brake 48 is adjoined by a second reduction gear unit 72. As an encoder 73', an absolute value encoder, for example a magnet (shown as encoder 73' in FIG. 2), as well as a housing 73, for example for accommodating the electronic chip 73", can be fitted axially-centrally on this second reduction gear unit 72 without any problems. Since no torques have to be transmitted via the second reduction gear unit 72, the latter can be configured as an inexpensive plastic gear unit.

An output element of the drive motor 44, which is not visible, is connected with an input element of the reduction gear unit 46, which is also not visible, the output shaft 54 of the reduction gear unit being connected, via the rotation post bearing 30, with the rotation post 24. The rotation post 24 tapers below the drive unit 22.

The guide shaft 32 extends from within the housing 42 into the bearing 34, with the bearing being connected to the retaining component 40 of the vehicle.

The torque generated by the drive motor 44 is transmitted via the reduction gear unit 46 onto the gear output shaft 54. In case of an emergency, only the brake 48 must be released, after which the manual actuation of the passenger door is readily possible due to the lack of self-locking action of the reduction gear unit 46.

Instead of or in addition to the brake 48, a short circuit device can also be provided for locking, which short-circuits the motor windings of the drive motor 44 for locking.

Figure 3:
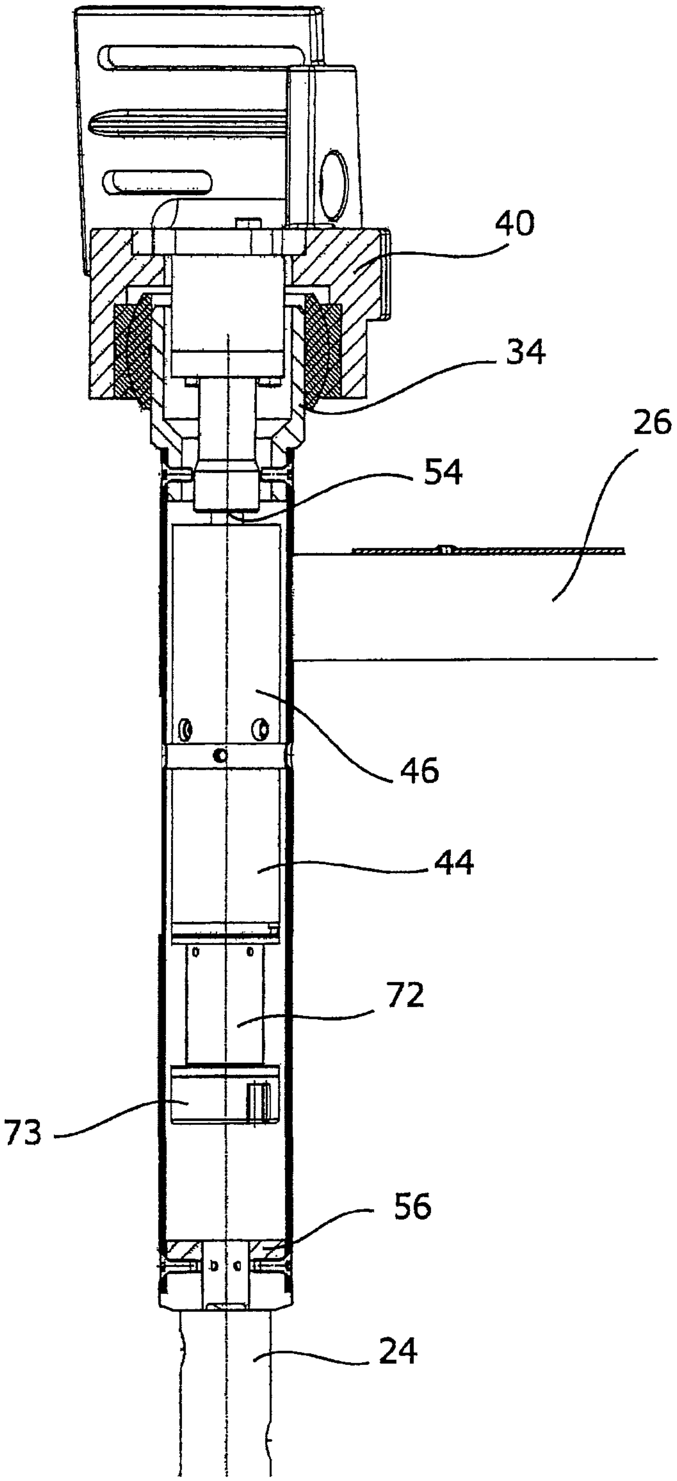
FIG. 3 shows a sectional view of a second embodiment of the support of the drive device.

FIG. 3 shows a second exemplary embodiment of the drive device 20. In this case, the gear output shaft 54 acts as a guide shaft 32, protrudes into the bearing 34 and is non-rotatably mounted there. The housing of the reduction gear unit 46 is non-rotatably connected to the rotation post 24. If the drive motor is energized, the housing of the reduction gear unit 46 of the drive unit 22 also rotates, so that the rotation post 24 is made to rotate. In this embodiment, a housing 42 for the drive unit and the torque support (guide 66) in the region of the bearing 32 can be omitted. The second reduction gear unit 72, which has, for example, the same reduction ratio as the reduction gear unit 46 and is made of plastic, is attached to the drive motor 44.

All electrical and mechanical connector elements, e.g. a Bowden cable for manual unlocking of the brake, if necessary, are disposed within the housing 22. If the drive device 20 is used in a lift-and-turn unit, a sensor for detecting lift can also be used.

Figure 4:
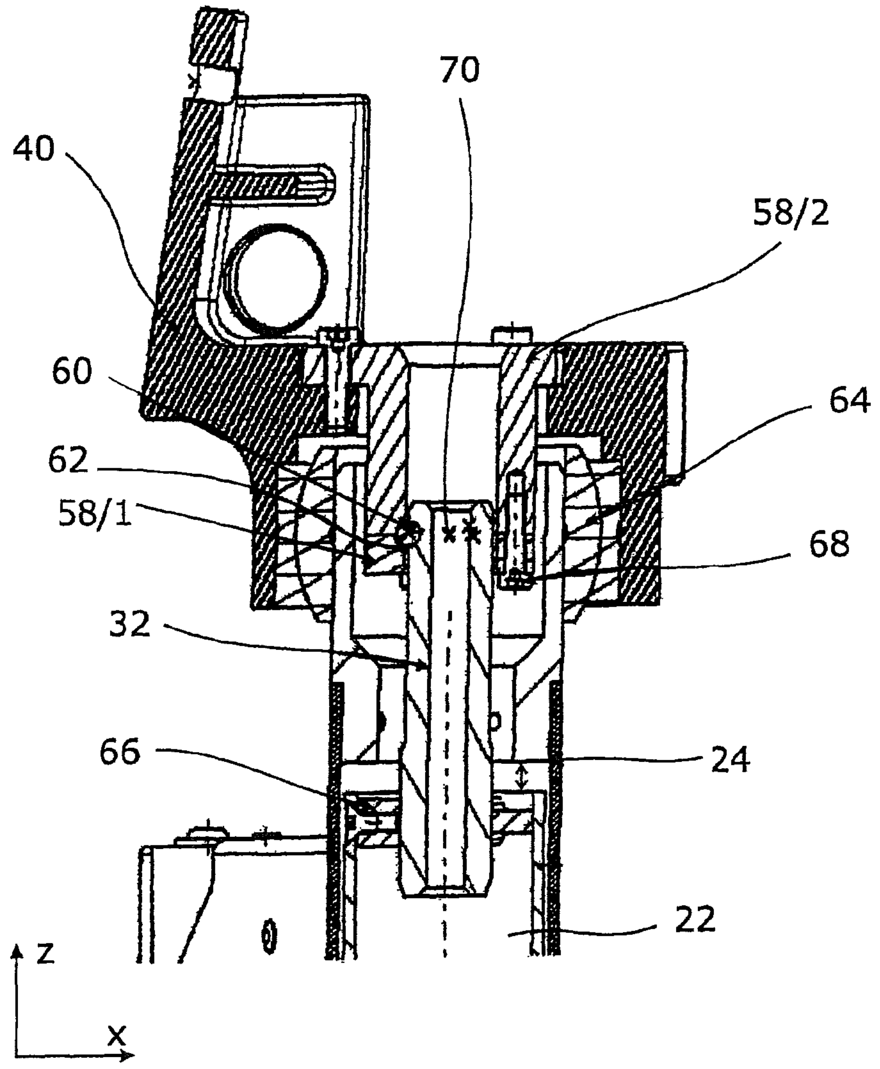
FIG. 4 shows a sectional view of a support of the drive device.

FIG. 4 illustrates the advantageous support of the drive device 20. What is depicted is the bearing region according to the embodiment from FIG. 2. The retaining component 40 serves as support for the torque of the drive unit 22. The bearing 34 is configured as a ball shaft joint bearing, and the guide shaft 32 is guided in a two-part ball receptacle 58 by means of balls 60. The guide shaft 32 comprises ball-shaped receptacles for the balls 60 which keep them in position. Corresponding elongated depressions 62 are provided in the two-part ball receptacle 58, which extend in the Z-direction. Because of these guides, the guide shaft 32 is capable of executing tumbling movements. The depressions 62 allow the guide shaft 32 to tumble in the Z-direction, the ball-shaped depressions in the guide shaft 32 allow the torque to be transmitted about the longitudinal axis Z-Z.

The rotation post 24 is supported via the joint bearing 64, in which the rotation post 24 is able to rotate about the longitudinal axis Z-Z and compensate tumbling movements. In order for the tumbling movements of the rotation post 24 and the drive device 20 to be able to run synchronously, the ball receptacle 58 is disposed centrally in the Z-direction in the joint bearing 64. The rotation post 24 and the guide shaft 32 thus have a joint tumbling point 70, so to speak, which is disposed on the longitudinal axis Z-Z. In order to permit the drive unit 22 to slide in the Z-direction during tumbling, the guide shaft 32 is provided with a multi-edged geometry that can glide slidably in the Z-direction in a guide 66 and transmits the torque of the drive unit 22.

Figure 5:
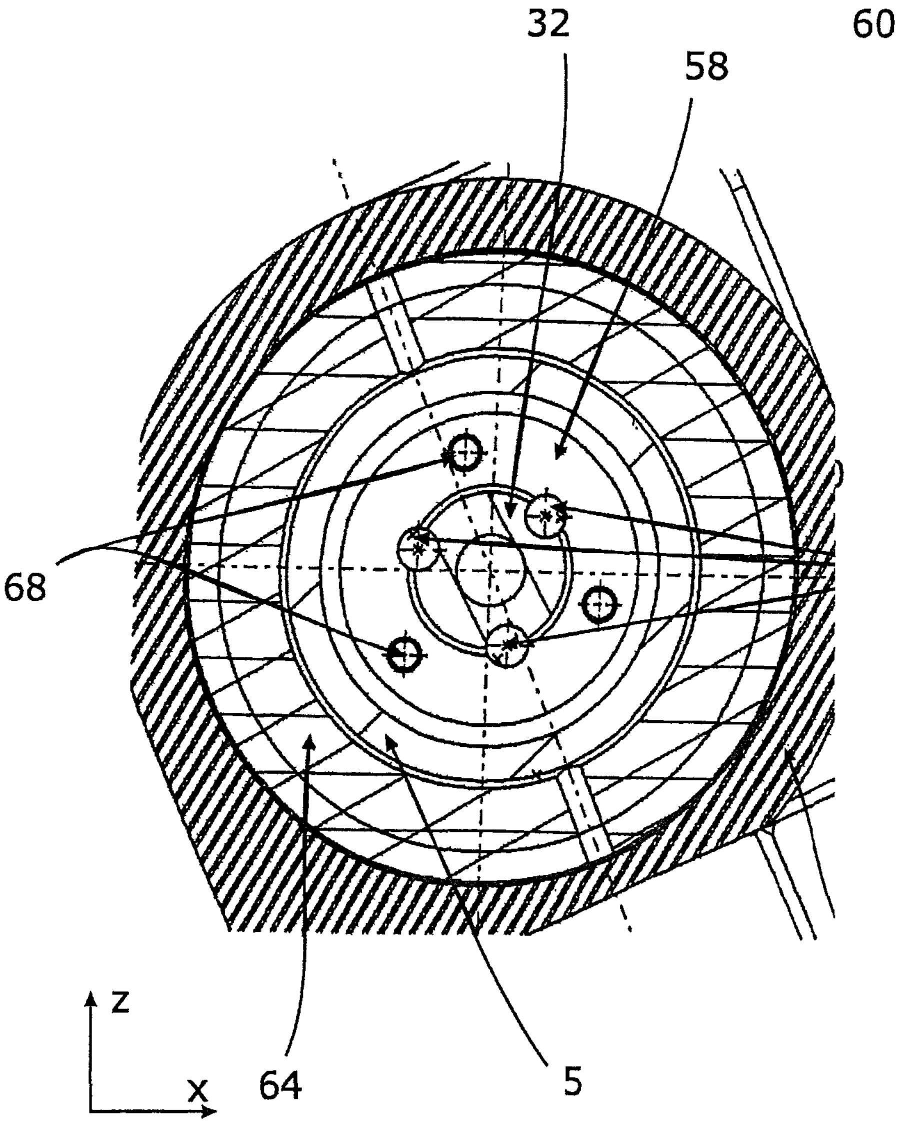
FIG. 5 shows a cross section through the bearing for illustrating the arrangement of balls.

FIG. 5 shows a cross section through the bearing 34 and illustrates the arrangement of the balls 60. Screws 68, which connect the two ball receptacles 58 to each other, are visible.

Figure 6:
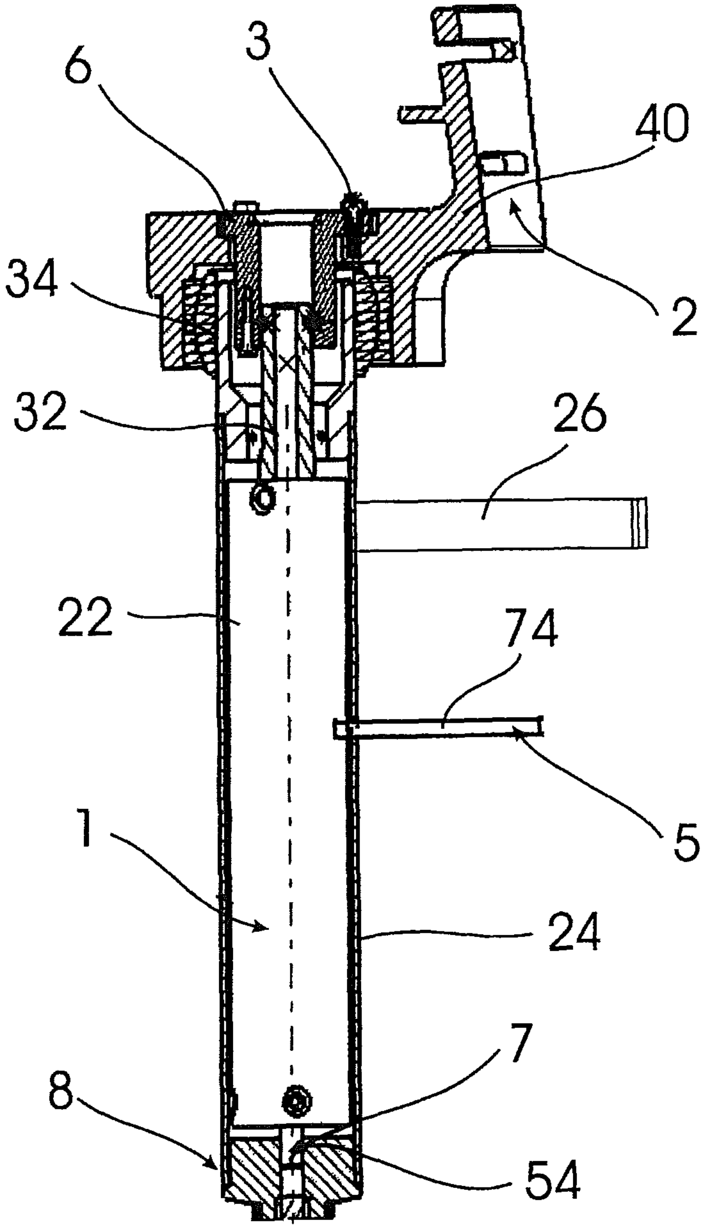
FIG. 6 shows an embodiment according to the invention in an axial section with an actuating element.

FIG. 6 illustrates a first embodiment of the drive device 20 according to the invention. An actuating element 74, which in this exemplary embodiment is attached to a housing 42 of the drive unit, is shown on the drive unit 22. Alternatively, an attachment directly to the drive unit 22 is also possible. The actuating element 74, with its free end, is connected to a locking apparatus, which is not shown, for locking and unlocking the entry/exit facilities. Due to a rotary movement of the drive unit 22 about an axis of rotation Z-Z, the actuating element 74 moves and actuates the locking apparatus. The bearing 34, which receives the guide shaft 32, is itself, according to the invention, connected to the retaining component 40 via another rotation bearing 76. The rotation bearing 76 permits the distribution of the torque pick-off for, on the one hand, the actuation of the locking apparatus, and on the other hand, for the rotation of the rotation post 24.

Figure 7:
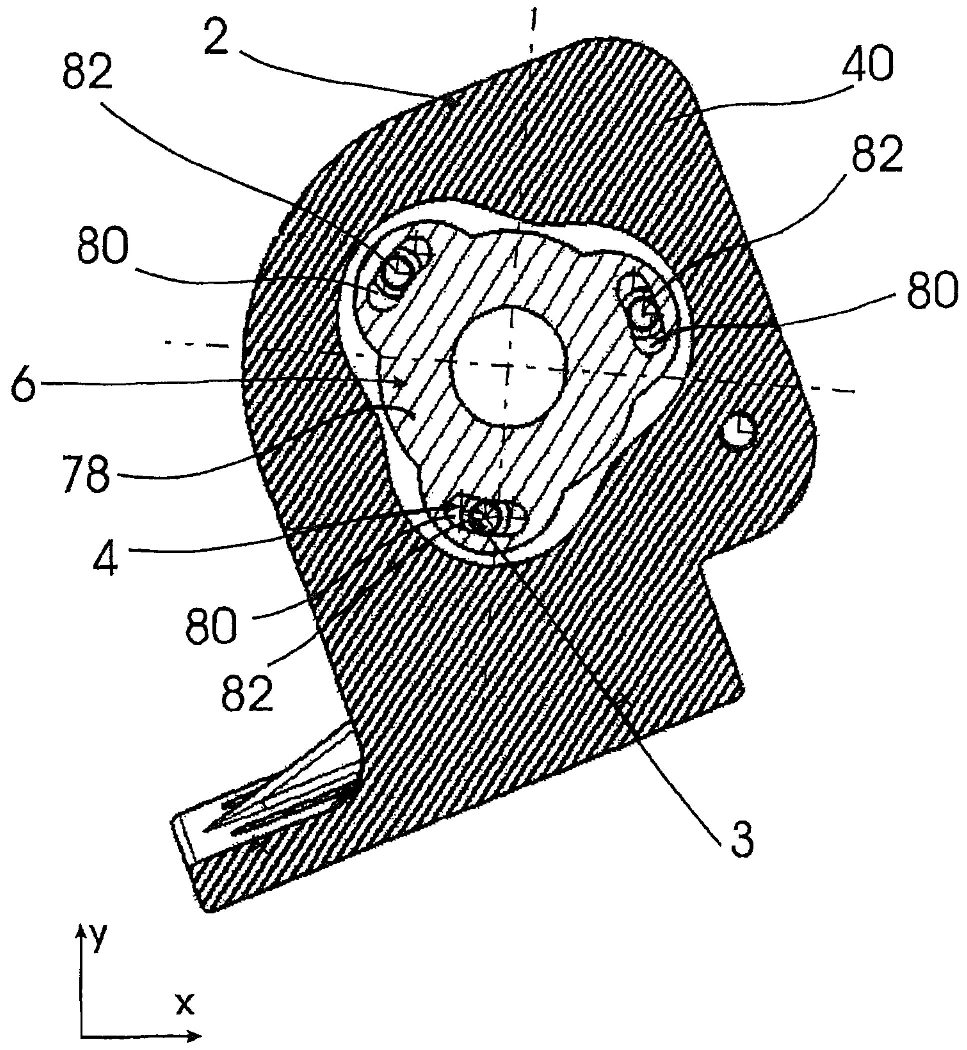
FIG. 7 shows a sectional view of a support according to the invention of the drive unit for entry/exit facilities with a torque distribution.

FIG. 7 shows a cross section of the rotation bearing 76. What can be seen is that a torque transmission component 78 extending from the bearing 34 extends into the retaining component 40 and there has sufficient space for rotation about a certain degree of rotation. In the exemplary embodiment shown, the torque transmission component 78 has three elongated holes 80 into which stationary bolts extend 82. The support between the bolts 82 and the elongated holes 80 can take place, for example, by means of slide or anti-friction bearings. Thus, when the drive unit 22 is switched on, the drive unit 22 turns first, because in the case of a locked door, the closing or locking apparatus presents the lower resistance. Because the rotation post 24 cannot be moved at the output shaft 54 due to the closed door, the drive unit 22, and thus, the actuating element 74 is moved, whereby the door is unlocked. If the bolts 82 come to abut against the ends of the elongated holes 80, the rotary movement of the drive unit 24 is blocked and the torque of the output shaft 54, which continues to rotate, is transmitted onto the rotation post 24 and thus, the supporting arms 26. Though three elongated holes 80 are shown, an embodiment with only one or more than three elongated holes 80 is also conceivable.

The invention is not limited to the exemplary embodiments described, but also includes other embodiments acting with the same effect. The description of the Figures merely serves for understanding the invention.

What is claimed is:

1. A rotary travel detection device for public transport vehicles comprising:
- a drive device for a pivotably and/or slidably mounted entry/exit facility, including a drive unit comprising:
  - an electrical drive motor,
  - a first reduction gear unit connected to an output shaft of the electrical drive motor via which torque for moving the entry/exit facility is transmitted,
  - a second reduction gear unit also connected with the electrical drive motor and located between the electrical drive motor and,
  - an encoder for determining a position of an output shaft of the second reduction gear unit via which no torque for moving the entry/exit facility is transmitted,
- wherein this drive unit is disposed in and drives a rotation post, which rotates about an axis of rotation in opening and closing processes, and opens and closes the entry/exit facility, and is retained, via a retaining component, on the vehicle, wherein the retaining component acts as a counter-bearing for a torque of the drive unit so that the output torque of the drive device can be transmitted onto the rotation post that rotates.

2. The rotary travel detection device according to claim 1, wherein the second reduction gear unit has a reduction ratio the same as the first reduction gear unit.

3. The rotary travel detection device according to claim 1, wherein the encoder is configured as an absolute value encoder.

4. The rotary travel detection device according to claim 1, wherein the encoder is formed by a magnet and the reduction gear unit is adjoined by a housing with an electronic chip.

5. The rotary travel detection device according to claim 1, wherein the second reduction gear unit is made from plastic.

6. The rotary travel detection device according to claim 1, further comprising an actuating element connected with the drive unit and a locking apparatus, wherein, during the opening process of the entry/exit facility, when a torque is generated by the drive unit, the actuating element is first moved for actuating the locking apparatus and the torque of the drive unit is only then transmitted onto the entry/exit facility.

7. The rotary travel detection device according to claim 6, wherein
- the actuating element is non-rotatably connected to a housing of the drive unit, the entry/exit facility is connected to the drive unit via an output shaft, via which torque for moving the entry/exit facility is transmitted, a rotation bearing is provided, which permits rotation of the housing of the drive unit by a certain number of degrees in both directions of rotation, wherein, during the opening process of the entry/exit facility, the drive unit with the actuating element moves first, and the locking apparatus is actuated, then the rotary movement of the housing of the drive unit is blocked and the torque of the drive unit is transmitted via the output shaft onto the entry/exit facility.

8. The rotary travel detection device according to claim 7, wherein the rotation bearing comprises a torque transmission component connected to the drive unit and comprising at least one elongated hole, into which a stationary bolt extends.

9. The rotary travel detection device according to claim 6, wherein, between the drive unit and the retaining component a bearing is provided which allows the rotation post to tumble and prevents a rotation about the axis of rotation.

10. The rotary travel detection device according to claim 9, wherein a guide shaft extends from the drive unit into a bearing and comprises receptacles for receiving balls disposed in depressions of the ball receptacle of the bearing, wherein the depressions permit a movement of the balls in a longitudinal direction, so that the guide shaft is mounted moveably in the longitudinal direction via the balls, but non-rotatably about the longitudinal axis in the ball receptacle.

* * * * *